United States Patent
Yoshida

[11] Patent Number: 6,115,143
[45] Date of Patent: Sep. 5, 2000

[54] COMMUNICATION DEVICE IN WHICH DATA TRANSMISSION BETWEEN A MODEM AND A CONTROLLER IS PERFORMED ON THE BASIS OF INTERRUPT PROCESSING

[75] Inventor: Takehiro Yoshida, Tokyo, Japan

[73] Assignee: Canon Kabushiki Kaisha, Tokyo, Japan

[21] Appl. No.: 08/831,647

[22] Filed: Apr. 9, 1997

[30] Foreign Application Priority Data

Apr. 12, 1996 [JP] Japan ................................ 8-115426

[51] Int. Cl.⁷ .................................................. H04N 1/00
[52] U.S. Cl. .................................................. 358/437
[58] Field of Search .................... 358/443, 468, 358/434, 435, 436, 437, 442; 710/260, 264, 265

[56] References Cited

U.S. PATENT DOCUMENTS

| | | | |
|---|---|---|---|
| 4,939,767 | 7/1990 | Saito et al. ............................. | 379/53 |
| 5,351,134 | 9/1994 | Yaguchi et al. ......................... | 358/435 |
| 5,353,125 | 10/1994 | Nakagawa et al. ..................... | 358/439 |
| 5,491,565 | 2/1996 | Naper ...................................... | 358/468 |
| 5,812,279 | 9/1998 | Fukushima et al. .................... | 358/404 |
| 5,946,104 | 8/1999 | Yoshida ................................... | 358/412 |

*Primary Examiner*—Andrew W. Johns
*Attorney, Agent, or Firm*—Fitzpatrick, Cella, Harper & Scinto

[57] ABSTRACT

A communication device such as a facsimile device, in which data is transmitted between a modem and a controller on the basis of interrupt processing, changes the rule associated with the timing of generating an interrupt request from the modem to the controller depending on the transmission rate of the modem, so that data transmission between the modem and the controller can be correctly performed even when the modem performs transmission at a high speed.

30 Claims, 6 Drawing Sheets

COMMUNICATION DEVICE IN WHICH DATA TRANSMISSION BETWEEN A MODEM AND A CONTROLLER IS PERFORMED ON THE BASIS OF INTERRUPT PROCESSING

BACKGROUND OF THE INVENTION

1. Field of the Invention

The present invention relates to a communication device in which data transmission between a modem and a controller is performed on the basis of interrupt processing.

2. Description of the Related Art

In conventional communication devices of this type, such as a facsimile device, interrupt processing is performed in a fixed manner in the operation of receiving procedural signals and image signals. That is, a modem generates an interrupt to a CPU (controller) each time the modem has received one byte of data.

In recent years, the recommendation V.34 has been accepted widely, and the transmission speed has become as high as 28.8 kb/s. In such a high speed operation, however, if an interrupt is generated each time one byte of data is received, the interrupt request can make it impossible for the device to operate correctly at the required speed. To avoid the above problem, it has been recommended that an interrupt be generated each time a plurality of bytes of data have been received. However, the details of the method of controlling the interrupt processing are not defined in the recommendation.

SUMMARY OF THE INVENTION

In view of the above, the general object of the invention is to provide an improved communication device. More specifically, it is an object of the present invention to provide a technique of properly dealing with interrupt processing between a modem and a controller even when a high transmission speed is selected. The above and other objects, features, and advantages of the invention will become apparent from the following more particular description of embodiments as illustrated in the accompanying drawings.

DESCRIPTION OF THE PREFERRED EMBODIMENT

The invention will be described in greater detail below with reference to preferred embodiments in conjunction with the accompanying drawings.

Figure 1:
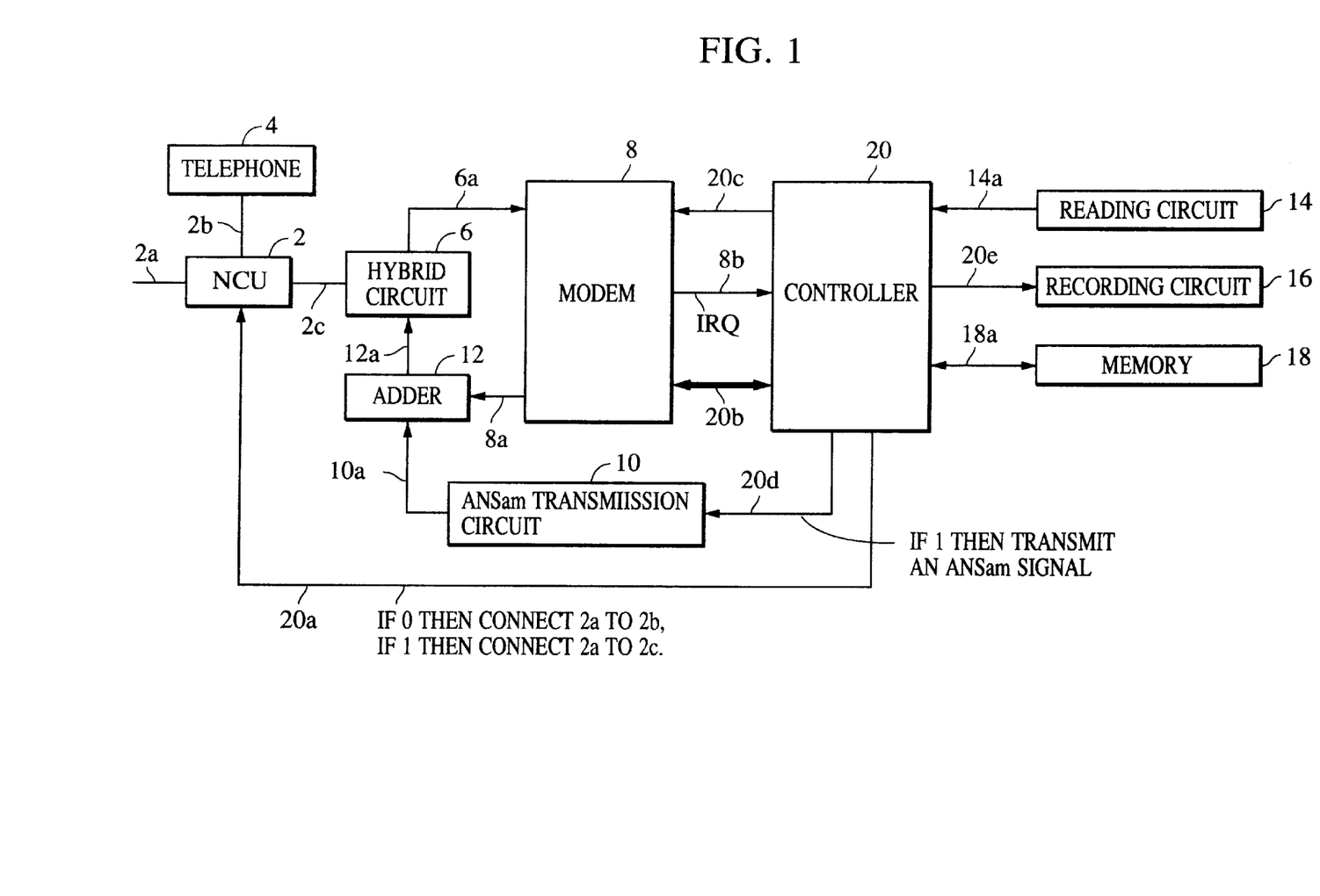
FIG. 1 is a block diagram illustrating an embodiment of the present invention.

FIG. 1 is a block diagram illustrating the construction of a facsimile device according to an embodiment of the invention.

An NCU (network control unit) 2 is connected to an end of a telephone line so as to control the connection to a telephone network and keep a loop, thereby making it possible to perform data communication via the telephone network. If a control signal received (via a signal line 20a) from a controller 20 is at a "0" level, the NCU 2 connects the telephone line 2a to a telephone set 4. On the other hand in the case where the control signal received from the controller 20 is at a "1" level, the NCU 2 connects the telephone line 2a to the facsimile device. In a normal state, the telephone line 2a is connected to the telephone set 4.

A hybrid circuit 6 separates a transmission signal and a reception signal from each other. If the hybrid circuit 6 receives a transmission signal from an addition circuit 12, the hybrid circuit 6 transmits it over the telephone line 2a via the NCU 2. On the other hand, a signal received via the NCU 2 transmitted from a device at another location is transferred to a modem 8 via a signal line 6a.

The modem 8 serves to perform modulation and demodulation in an operation mode according to any of the ITU-T recommendations V.8, V.21, V.27ter, V.29, V.17, or V.34 wherein the operation mode is designated by the controller 20 via a signal line 20c. The controller 20 also designates via the signal line 20c the number of bytes of data to be received before generating an interrupt.

In a receiving operation, if the modem 8 receives a designated number of bytes of data, or if it detects an abort signal or a closed flag, it outputs an IRQ (interrupt request) signal over a signal line 8b. If the designated number of bytes of data has been read, or if a STATUS has been read, the modem 8 turns off the IRQ signal.

An ANSam transmission circuit 10 serves to transmit an ANSam signal. When a signal line 20d is at a "1" level, the ANSam transmission circuit 10 transmits an ANSam signal over a signal line 10a, while it transmits no signal over the signal line 10a when the signal line 20d is at a "0" level.

The addition circuit 12 receives information via a signal line 8a and information via the signal line 10a, and adds them together. The resultant signal is output over a signal line 12a. A reading circuit 14 reads the image of a document, and outputs the resultant image data over a signal line 14a. A recording circuit 16 records information line by line according to a signal received via a signal line 20e.

A memory 18 stores raw image data or coded information. The memory 18 is also used to store received information or decoded information.

The controller 20 includes a microcomputer, a ROM, a RAM and other elements, and controls the operation for the entire facsimile device. Particularly in this embodiment, when the facsimile device is in a normal G3 mode operation, the controller 20 counts the number of bytes of data so that interrupt processing associated with the modem 8 is properly performed depending on the data rate in the receiving operation. The above number of bytes of data is increased with the data rate in the receiving operation. In an ECM receiving operation, on the other hand, the above number of bytes is set to a constant value regardless of the data rate in the receiving operation. More specifically, when the receiving operation is performed at a data rate of 28.8 kb/s, 26.4 kb/s, or 24 kb/s in the normal G3 mode, an interrupt is generated each time 4 bytes of data are received. For a receiving operation at a data rate of 21.6 kb/s, 19.2 kb/s, or 16.8 kb/s, an interrupt is generated each time 3 bytes of data are received. On the other hand, at a data rate of 14.4 kb/s, 12 kb/s, or 9.6 kb/s, an interrupt is generated every 2 bytes, while an interrupt is generated every byte when the receiving operation is performed at a data rate of 7.2 kb/s, 4.8 kb/s, or 2.4 kb/s. In the ECM receiving operation, an interrupt is generated each time 4 bytes of data are received regardless of the data rate.

Figure 2:
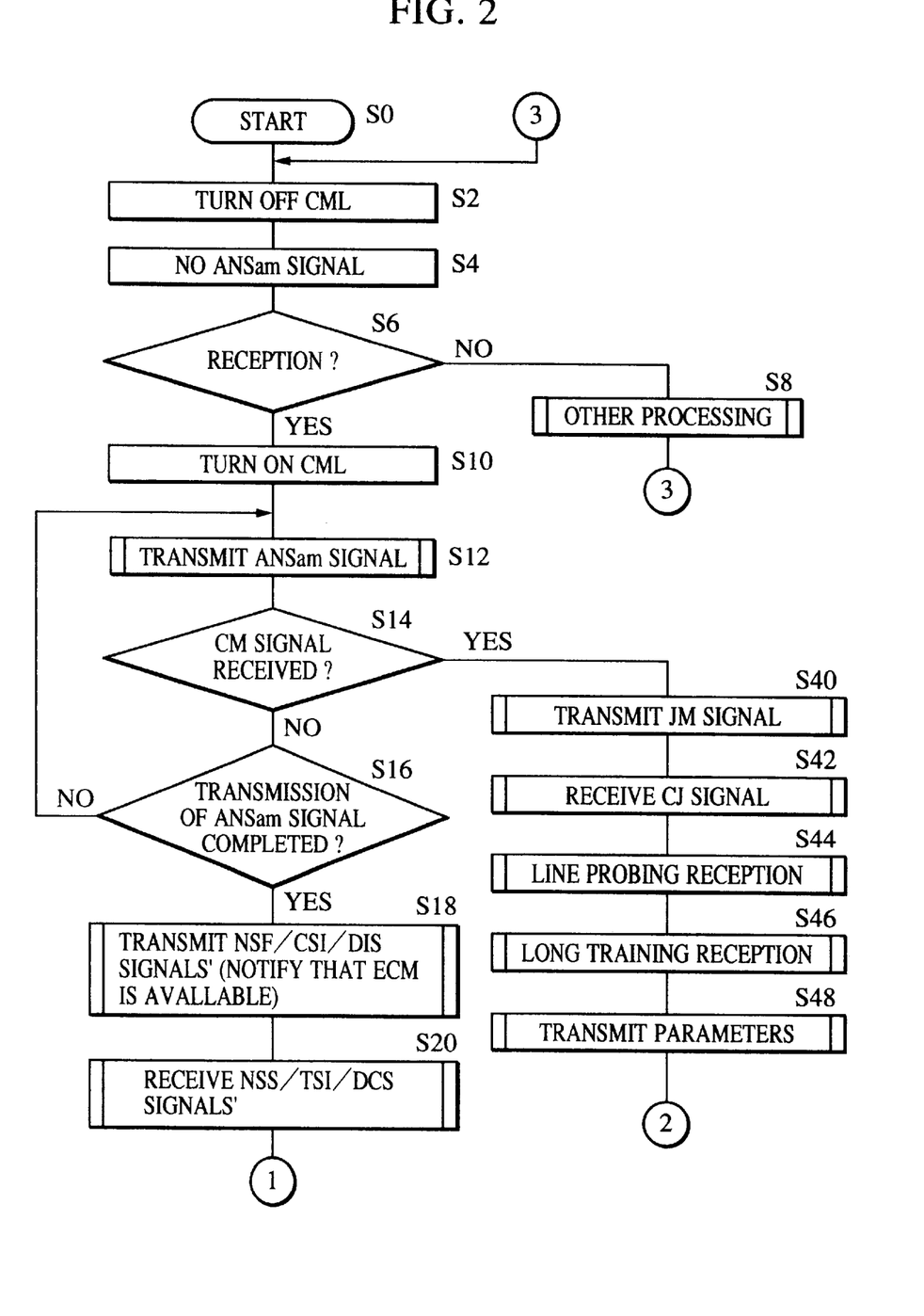
FIG. 2 is a flowchart illustrating operation steps for the embodiment shown in FIG. 1.
Figure 3:
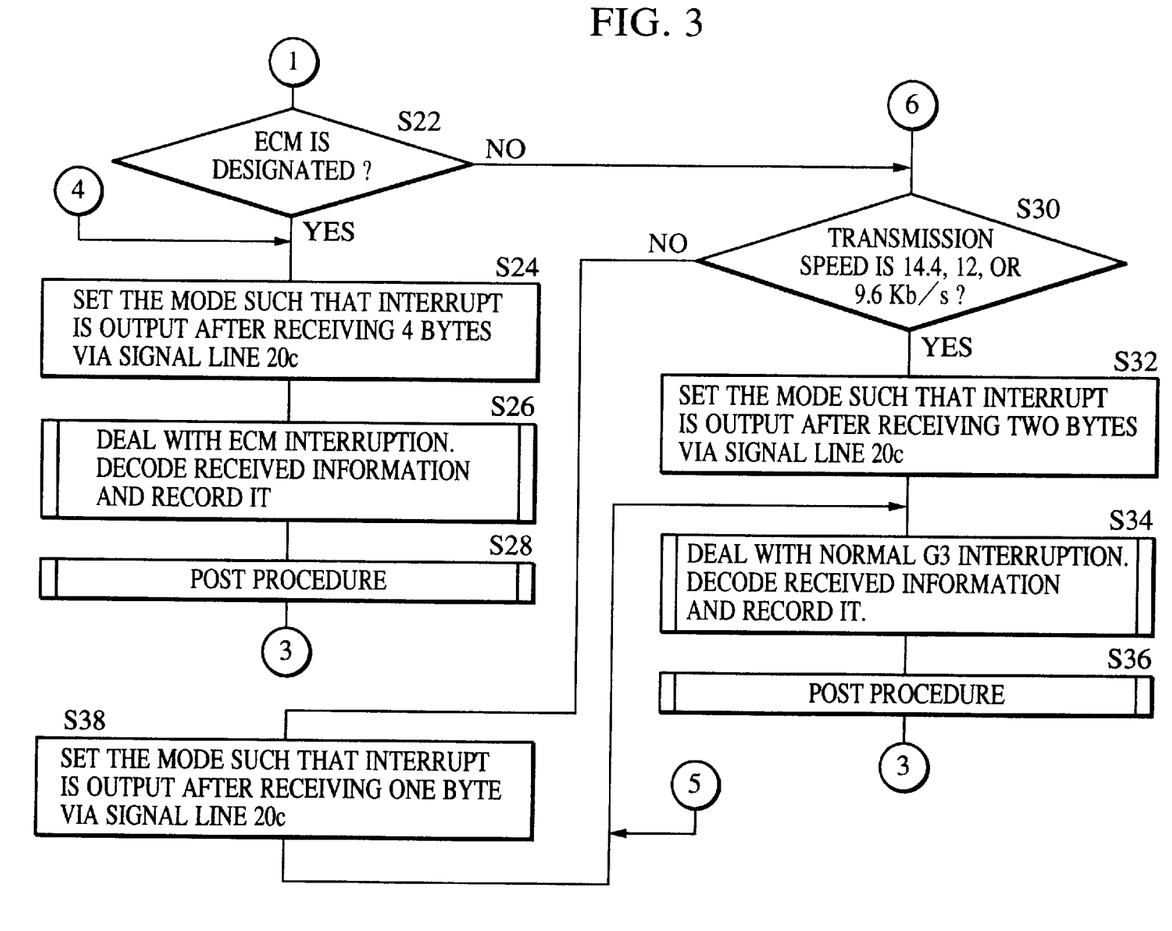
FIG. 3 is a flowchart illustrating other operation steps for the embodiment shown in FIG. 1.
Figure 4:
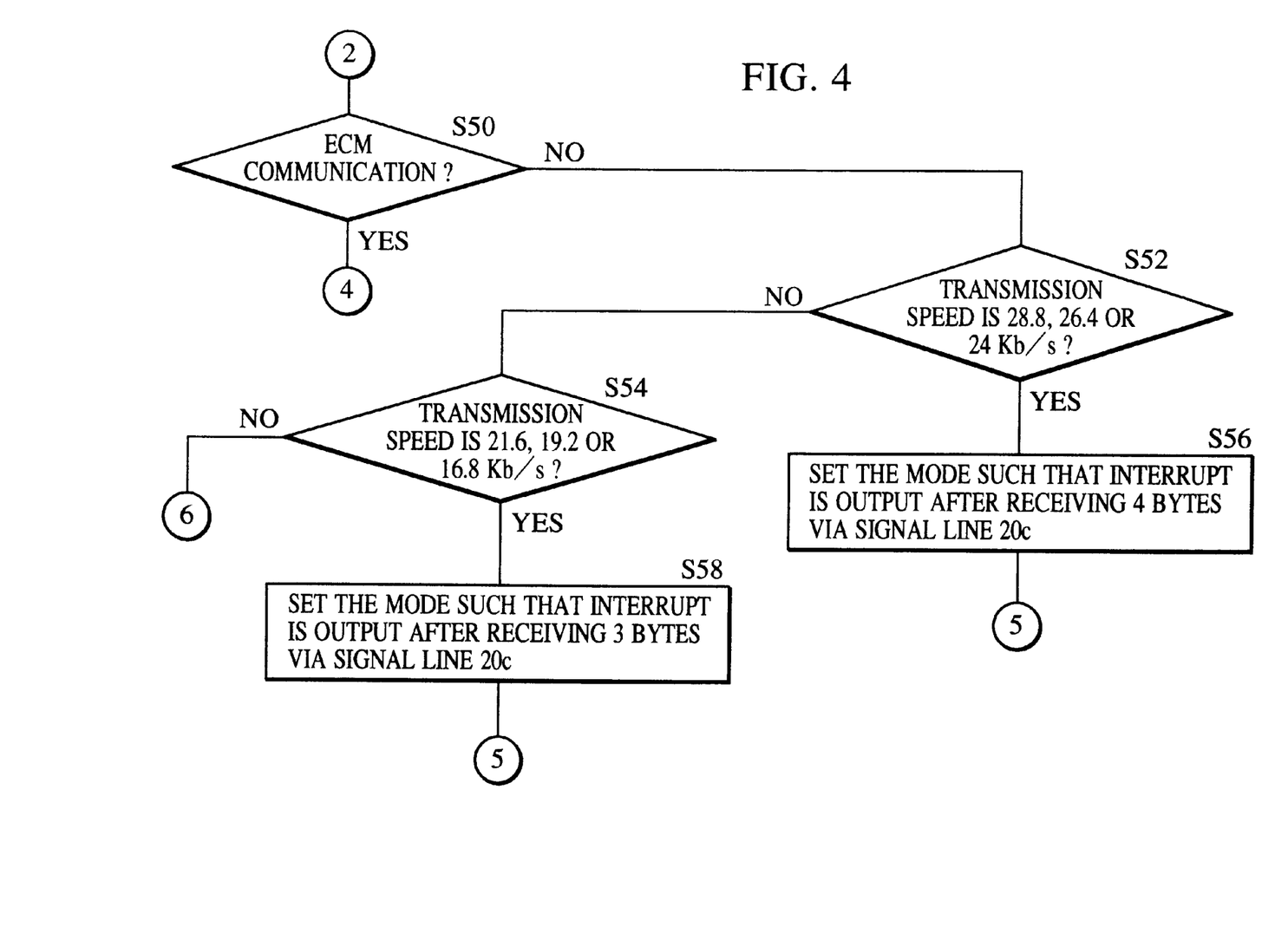
FIG. 4 is a flowchart illustrating still other operation steps for the embodiment shown in FIG. 1.
Figure 5:
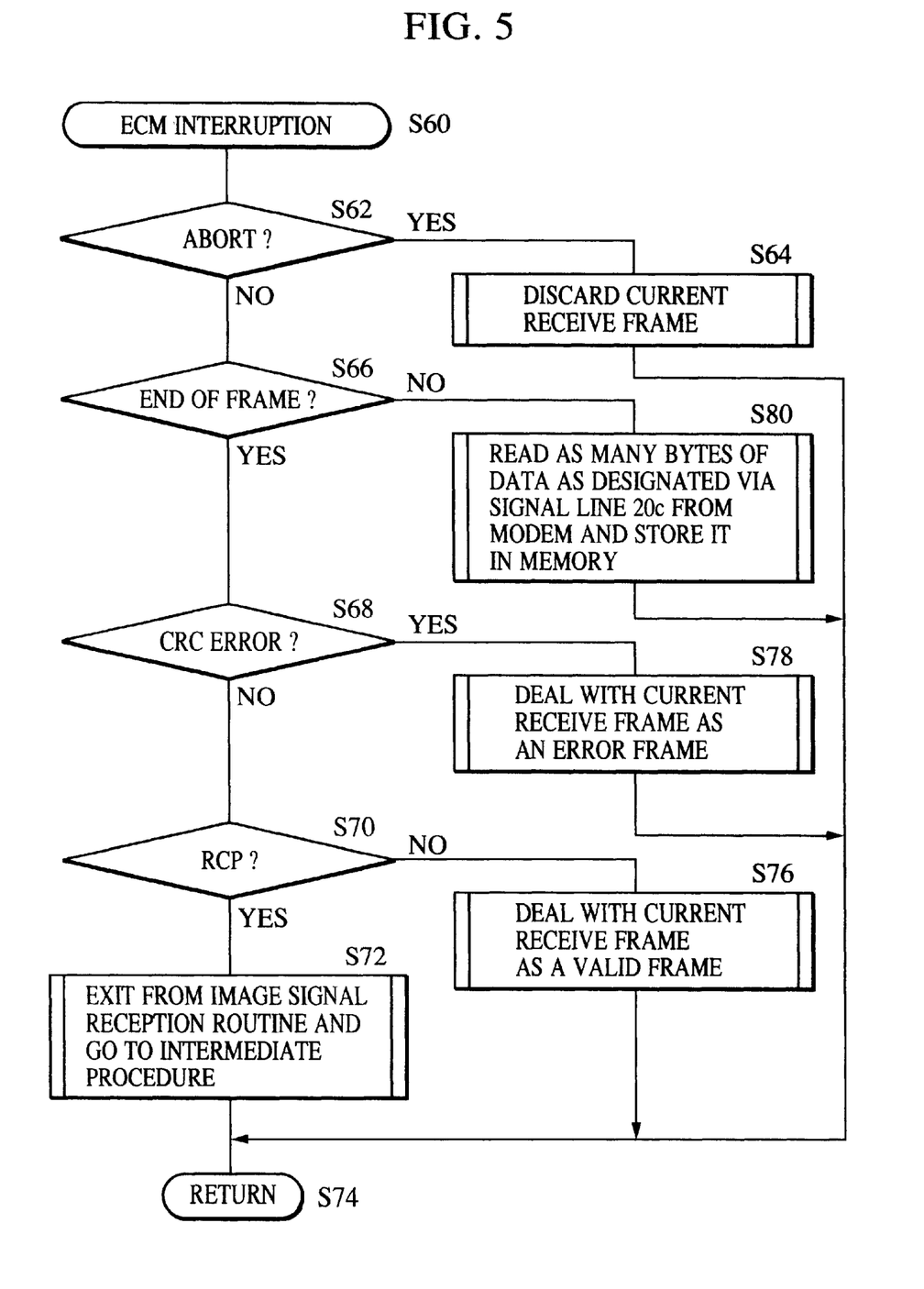
FIG. 5 is a flowchart illustrating still other operation steps for the embodiment shown in FIG. 1.
Figure 6:
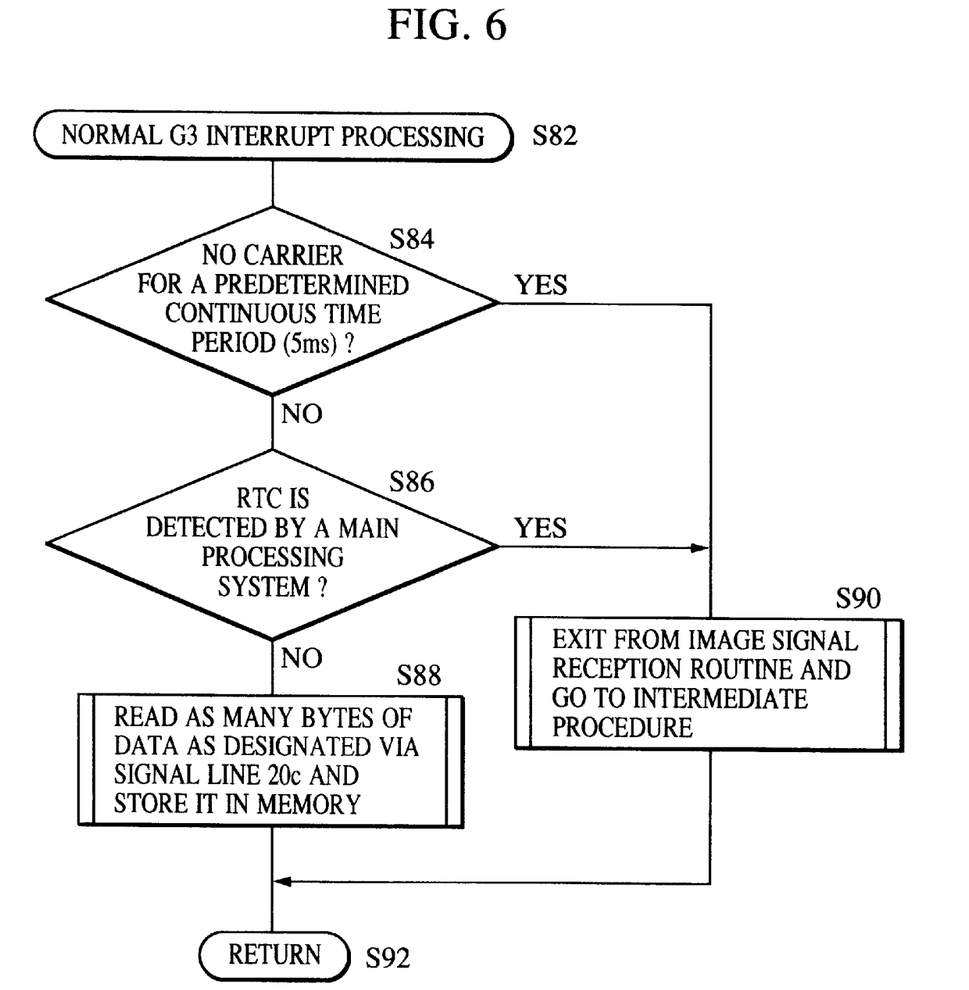
FIG. 6 is a flowchart illustrating other operation steps for the embodiment shown in FIG. 1.

FIGS. 2 to 6 are flowcharts illustrating the control operation performed by the controller 20 according to the present embodiment of the invention, wherein FIGS. 2 to 4 are concerned with the main routine and FIGS. 5 and 6 are concerned with the interrupt processing routine.

Referring first to FIG. 2, the operation is started at step S0. In step S2, a "0"-level signal is output over the signal line 20a so as to turn off the CML. Then in step S4, a "0"-level signal is output over the signal line 20d so that no ANSam signal is output.

In step S6, the controller 20 judges whether the operation is in a receiving mode. If yes then the process goes to step S10. If no, then the process goes to step S8 and performs other processing. Then the process returns to step S2.

In step S10, the controller 20 transmits a "1"-level signal over the signal line 20a so as to turn on the CML. Then in step S12 the controller 20 transmits a V.8 ANSam signal.

In step S14, the controller 20 judges whether a V.8 CM signal has been received. If a CM signal has been received, the process goes to step S40 while the process goes to step S16 if no CM signal has been received.

In step S16, the controller 20 judges whether the transmission of the ANSam signal has been completed. If yes, the process goes to step S18. If no, the process goes to step S12.

In step S18, NSF/CSI/DIS signals are transmitted according to the V.21 standard in which it is indicated by the DIS signal that ECM receiving capability is available. In step S20, V.21 NSS/TSI/DCS signals are received.

Then in step S22, the controller 20 judges whether an ECM communication mode is designated by the DCS signal. If yes the process goes to step S24, while the process goes to step S30 when the ECM communication mode is not designated.

In step S24, the controller 20 transmits a control signal via the signal line 20c to the modem 8 so as to set the operation mode such that an interrupt is generated each time 4 bytes of data are received. In step S26, interrupt processing in the ECM mode is performed, and received information is decoded and recorded. Then in step S28, a post procedure is performed. After that, the process returns to step S2.

In step S30, the controller 20 judges whether the transmission speed is any of the following values: 14.4 kb/s, 12 kb/s, and 9.6 kb/s. If yes, then the process goes to step S32. If no, that is, if the transmission speed is any of 7.2 kb/s, 4.8 kb/s, or 2.4 kb/s, the process goes to step S38.

In step S32, the controller 20 transmits a control signal via the signal line 20c to the modem 8 so as to set the operation mode such that an interrupt is generated each time 2 bytes of data are received. In step S34, interrupt processing in the normal G3 mode is performed, and received information is decoded and recorded. Then in step S36, a post procedure is performed. After that, the process returns to step S2.

In step S38, the controller 20 transmits a control signal via the signal line 20c to the modem 8 so as to set the operation mode such that an interrupt is generated each time one byte of data is received. Then, the process goes to step S34.

In step S40, a JM signal is transmitted, according to the standard V.8. In the following step S42 a CJ signal is received according to the standard V.8. In step S44, line probing reception is performed, and in the following step S46 a long training signal is received. In step S48, parameters are transmitted and then the process goes to step S50.

In step S50, the controller 20 judges whether transmission is performed in the error correction mode (ECM). If yes, the process goes to step S24, while the process goes to step S52 when the transmission mode is not the ECM.

In step S52, the controller 20 judges whether the transmission speed is any of 28.8 kb/s, 26.4 kb/s, or 24.0 kb/s. If yes then the process goes to step S56. If no, the process goes to step S54.

In step S54, the controller 20 judges whether the transmission speed is any of 21.6 kb/s, 19.2 kb/s, or 16.8 kb/s. If yes then the process goes to step S58. If no, the process goes to step S30.

In step S56, the controller 20 transmits a control signal via the signal line 20c to the modem 8 so as to set the operation mode such that an interrupt is generated each time 4 bytes of data are received. The process then goes to step S34. In step S58, the controller 20 transmits a control signal via the signal line 20c to the modem 8 so as to set the operation mode such that an interrupt is generated each time 3 bytes of data are received. The process then goes to step S34.

In step S60 in FIG. 5, ECM interrupt processing is started. In step S62, the controller 20 acquires status information on the signal line 20b and judges whether an abort has been generated. If an abort has been generated, the process goes to step S64 at which the current receive frame is discarded. Then the process goes to step S74 and exits from the routine.

If no abort has been generated, the process goes to step S66. In step S66, the controller 20 judges whether an EOF (end of file) is detected on the basis of the status information on the signal line 20b obtained in step S62. If an EOF is detected, the process goes to step S68. If not, the process goes to step S80, and the controller 20 reads as many bytes of data as designated via the signal line 20c from the modem via the signal line 20b. The obtained data is stored in the memory. Then the process goes to step S74, and exits from the routine.

In the case where an EOF is detected in step S66, the process goes to step S68, and the controller 20 judges whether there is an CRC error on the basis of the status information on the signal line 20b. If an error is detected, the process goes to step S78 and the current receive frame is dealt with as an error frame. In the case where no error is detected, the process goes to step S70.

In step S70, the controller 20 judges whether an RCP signal is detected on the basis of the status information on the signal line 20b obtained in step S62. If no RCP signal is detected, the process goes to step S76 and the current receive frame is dealt with as a normal frame. The process then goes to step S74 and exits from the routine. In the case where an RCP signal is detected in step S70, the process goes to step S72 and stops the image signal receiving operation. Then an intermediate procedure is performed. The process then goes to step S74 and exits from the routine.

In step S82 in FIG. 6, normal G3 interrupt processing is started. In the normal G3 mode, an RTC signal can be detected only when received information is decoded in real time. Therefore, when the transmission speed is low, if it is attempted to wait for arrival of a plurality of bytes, the image signal receiving operation is terminated. Therefore, it is required to change the number of bytes of data to be received before generating an interrupt depending on the transmission speed.

In step S84, the controller 20 judges whether there is no carrier for a predetermined continuous period of time, for example 5 ms. If no carrier is detected for a continuous period of 5 ms, the process goes to step S90 and stops the image signal receiving operation. Then an intermediate procedure is performed. The process then goes to step S92 and exits from the routine.

If, in step S90, a carrier is detected for a continuous period of 5 ms, the process goes to step S86. In step S86, the controller 20 judges whether the main decoding system has detected an RTC signal. If an RTC signal has been detected, the process goes to the above-described step S90. If no RTC signal has been detected, the process goes to step S88, and the controller 20 reads as many bytes of data as designated via the signal line 20c from the modem via the signal line 20b. The obtained data is stored in the memory. Then the process goes to step S92, and exits from the routine.

In the present embodiment, as described above, an interrupt is generated after receiving a different number of bytes of data depending on the transmission speed. More specifically, the number of bytes of data is set to 4 bytes for a transmission speed of 28.8 kb/s, 2 bytes for 14.4 kb/s, and 1 byte for 7.2 kb/s. This allows the facsimile device to deal with a high-speed transmission while maintaining the system throughput at a high level. Furthermore, it also becomes possible to receive an RTC signal of an image signal and other procedural signals at right times without having an increase in delay before generating an interrupt.

In the case where a signal is received according to the HDLC format as is in the ECM communication, even if the operation mode is set such that an interrupt is generated each time a predetermined number of bytes are received, the interrupt is generated when a closed flag is detected, and therefore it is possible to generate an interrupt after receiving as great a number of bytes as allowed in each specific transmission rate. This allows a reduction in the number of PUSH or POP operations arising from the interrupt, and thus a reduction in the load to the system.

Although the present invention and its advantages have been described in detail with reference to specific embodiments, the description is illustrative of the invention and is not to be construed as limiting the invention. Various changes, substitutions and alterations can be made herein without departing from the spirit and scope of the invention.

What is claimed is:

1. A communication device in which reading out of data from a modem by a controller is performed based on interrupt processing, said device comprising:
   a detector circuit adapted to detect a data reception rate associated with the modem; and
   a change processor adapted to change a rule associated with a timing of generating an interrupt request from the modem to the controller depending on the detected data reception rate, without changing the data reception rate.

2. A communication device according to claim 1, wherein said detector circuit and said chance processor are provided in the controller.

3. A communication device according to claim 1, wherein, when the modem has received a set amount of data, the modem outputs an interrupt request to the controller, and
   wherein said chance processor changes the set amount of data.

4. A communication device according to claim 3, wherein said chance processor increases the set amount of data when the detected data reception rate is high.

5. A communication device according to claim 3, wherein said change processor changes the set amount of data in units of bytes.

6. A communication device according to claim 3, wherein the modem receives data according to a facsimile communication procedure.

7. A communication device according to claim 6, wherein a first communication procedure and a second communication procedure are available as the facsimile communication procedure, and said change processor changes the set amount of data according to which of the first and second communication procedures is selected.

8. A communication device according to claim 7, wherein the first communication procedure is a standard G3 procedure, and the second procedure is an ECM (error correction mode) communication procedure, and the set amount of data is changed when communication is performed according to the standard G3 procedure, while the set amount of data is maintained constant regardless of the detected data reception rate when communication is performed according to the ECM communication procedure.

9. A method of reading out data from a modem by a controller based on interrupt processing, said method comprising the steps of:
   detecting a data reception rate associated with the modem; and
   changing a rule associated with a timing of generating an interrupt request from the modem to the controller depending on the detected data reception rate.

10. A method according to claim 9,
    wherein, when the modem has received a set amount of data, the modem outputs an interrupt request to the controller, and
    wherein the set amount of data is changed in said changing step.

11. A method according to claim 10, wherein, in said changing step, the set amount of data is increased when the detected data reception rate is high.

12. A method according to claim 10, wherein, in said changing step, the set amount of data is changed in units of bytes.

13. A method according to claim 10, wherein the modem receives data according to a facsimile communication procedure.

14. A method according to claim 13, wherein a first communication procedure and a second communication procedure are available as the facsimile communication procedure and, in said changing step, the set amount of data is changed according to which of the first and second communication procedures is selected.

15. A method according to claim 14, wherein the first communication procedure is a standard G3 procedure, and the second procedure is an ECM (error correction mode) communication procedure, and the set amount of data is changed when communication is performed according to the standard G3 procedure, while the set amount of data is maintained constant regardless of the detected data reception rate when communication is performed according to the ECM communication procedure.

16. A communication device in which reading out of data from a modem by a controller is performed based on a data block size, said device comprising:
    a detector circuit adapted to detect a data reception rate associated with the modem; and
    a change processor adapted to change the data block size used for reading out data from the modem depending on the detected data reception rate, without changing the data reception rate.

17. A communication device according to claim 16, wherein said detector circuit and said change processor are provided in the controller.

18. A communication device according to claim 16, wherein said change processor causes the modem to set the data block size to a desired amount.

19. A communication device according to claim 18, wherein said change processor increases the data block size when the detected data reception rate is high.

20. A communication device according to claim 18, wherein said change processor changes the data block size in units of bytes.

21. A communication device according to claim 18, wherein the modem receives data according to a facsimile communication procedure.

22. A communication device according to claim 21, wherein a first communication procedure and a second communication procedure are available as the facsimile communication procedure, and said change processor changes the data block size according to which of the first and second communication procedures is selected.

23. A communication device according to claim 22, wherein the first communication procedure is a standard G3 procedure, and the second procedure is an ECM (error correction mode) communication procedure, and the data block size is changed when communication is performed according to the standard G3 procedure, while the data block size is maintained constant regardless of the detected data reception rate when communication is performed according to the ECM communication procedure.

24. A method of reading out of data from a modem by a controller based on a data block size, said method comprising the steps of:

detecting a data reception rate associated with the modem; and changing the data block size used for reading out data from the modem depending on the detected data reception rate.

25. A method according to claim 24, wherein said changing step causes the modem to set the data block size to a desired amount.

26. A method according to claim 25, wherein said changing step increases the data block size when the detected data reception rate is high.

27. A method according to claim 25, wherein said changing step changes the data block size in units of bytes.

28. A method according to claim 25, wherein the modem receives data according to a facsimile communication procedure.

29. A method according to claim 28, wherein a first communication procedure and a second communication procedure are available as the facsimile communication procedure, and said changing step changes the data block size according to which of the first and second communication procedures is selected.

30. A method according to claim 29, wherein the first communication procedure is a standard G3 procedure, and the second procedure is an ECM (error correction mode) communication procedure, and the data block size is changed when communication is performed according to the standard G3 procedure, while the data block size is maintained constant regardless of the detected rate when communication is performed according to the ECM communication procedure.

* * * * *

UNITED STATES PATENT AND TRADEMARK OFFICE
CERTIFICATE OF CORRECTION

PATENT NO. : 6,115,143
DATED : September 5, 2000
INVENTOR(S) : Takehiro Yoshida

Page 1 of 1

It is certified that error appears in the above-identified patent and that said Letters Patent is hereby corrected as shown below:

COLUMN 4
Line 40, "an" should read --a--.

COLUMN 5

Line 54, "chance" should read --change--.
Line 60, "chance" should read -- change--.
Line 63, "chance" should read --change--.

Signed and Sealed this

Twelfth Day of June, 2001

Attest:

NICHOLAS P. GODICI
Acting Director of the United States Patent and Trademark Office Attesting Officer